United States Patent [19]

Rutherford

[11] Patent Number: 4,956,779
[45] Date of Patent: Sep. 11, 1990

[54] DIGITAL OVERSPEED CONTROLLER FOR USE IN A VITAL PROCESSING SYSTEM

[75] Inventor: David B. Rutherford, Rochester, N.Y.

[73] Assignee: General Signal Corporation, Stamford, Conn.

[21] Appl. No.: 267,218

[22] Filed: Nov. 22, 1988

[51] Int. Cl.$^5$ .............................................. B61L 23/00
[52] U.S. Cl. ............................ 364/426.05; 364/424.01; 246/182 R
[58] Field of Search ..................... 364/424.01, 426.05, 364/436, 565; 246/182 B, 182 R

[56] References Cited

U.S. PATENT DOCUMENTS

| | | | |
|---|---|---|---|
| 4,168,526 | 9/1979 | Auer, Jr. et al. | 364/569 |
| 4,181,943 | 1/1980 | Mercer, Sr. et al. | 364/426.05 |
| 4,181,945 | 1/1980 | Adler et al. | 364/436 |
| 4,279,395 | 7/1981 | Boggio et al. | 246/182 R |
| 4,495,578 | 1/1985 | Sibley | 364/426.05 |
| 4,617,627 | 10/1986 | Yasunobu et al. | 364/426.05 |
| 4,618,930 | 10/1986 | Ueno et al. | 364/426.05 |
| 4,740,972 | 4/1988 | Rutherford, Jr. | 371/53 |
| 4,794,551 | 12/1988 | Yoshida | 364/565 |
| 4,831,521 | 5/1989 | Rutherford, Jr. | 364/200 |
| 4,835,693 | 5/1989 | Smith et al. | 364/426.01 |

Primary Examiner—Thomas G. Black
Attorney, Agent, or Firm—John F. Ohlandt

[57] ABSTRACT

The functions to be performed by a digital overspeed controller are implemented by application of two concepts, namely "diverse channels" and "even/odd systems cycles"; in accordance with the first concept, two channels are maintained throughout the overspeed controller, beginning with two independent tachometer inputs; all of the functions involve operations to be performed in each of the two channels separately. The numerical results for each of the channels are different and the numerical difference between the two channels is used to prove the integrity of the functions described. The second concept of "even/odd system cycles" involves a "system cycle time", denoted $T_{CYC}$, that is nominally 100 milliseconds. All of the functions of the controller are performed each system cycle. In order to be able to vitally distinguish data results between adjacent cycles, the cycles are denoted EVEN and ODD, and the results of each of the operations produce different numerical values on even and odd cycles.

6 Claims, 12 Drawing Sheets

FIG.3B

| WHEEL SIZE | WW(1) | RETURNED DATA ON DATA BUS | | | | | | | |
|---|---|---|---|---|---|---|---|---|---|
| | | D0 | D1 | D2 | D3 | D4 | D5 | D6 | D7 |
| 31.00 | WW0 | IWNU | IWNU | IWNU | IWNU | IW00 | | | |
| 30.75 | WW1 | IW75 | IWNU | IWNU | IWNU | IW00 | IW25 | IW50 | IW75 |
| 30.50 | WW2 | IW50 | IWNU | IWNU | IWNU | IW00 | IW25 | IW50 | IW75 |
| 30.25 | WW3 | IW25 | IWNU | IWNU | IWNU | IW00 | IW25 | IW50 | IW75 |
| 30.00 | WW4 | IW00 | IWNU | IWNU | IWNU | IW00 | IW25 | IW50 | IW75 |
| 29.75 | WW5 | IWNU | IW75 | IWNU | IWNU | IW00 | IW25 | IW50 | IW75 |
| 29.50 | WW6 | IWNU | IW50 | IWNU | IWNU | IW00 | IW25 | IW50 | IW75 |
| 29.25 | WW7 | IWNU | IW25 | IWNU | IWNU | IW00 | IW25 | IW50 | IW75 |
| 29.00 | WW8 | IWNU | IW00 | IWNU | IWNU | IW00 | IW25 | IW50 | IW75 |
| 28.75 | WW9 | IWNU | IWNU | IW75 | IWNU | IW00 | IW25 | IW50 | IW75 |
| 28.50 | WW10 | IWNU | IWNU | IW50 | IWNU | IW00 | IW25 | IW50 | IW75 |
| 28.25 | WW11 | IWNU | IWNU | IW25 | IWNU | IW00 | IW25 | IW50 | IW75 |
| 28.00 | WW12 | IWNU | IWNU | IW00 | IWNU | IW00 | IW25 | IW50 | IW75 |
| 27.75 | WW13 | IWNU | IWNU | IWNU | IW75 | IW00 | IW25 | IW50 | IW75 |
| 27.50 | WW14 | IWNU | IWNU | IWNU | IW50 | IW00 | IW25 | IW50 | IW75 |
| 27.25 | WW15 | IWNU | IWNU | IWNU | IW25 | IW00 | IW25 | IW50 | IW75 |
| 27.00 | WW16 | IWNU | IWNU | IWNU | IW00 | IW00 | IW25 | IW50 | IW75 |

| TBL IXPSL | TBL PSL |
|---|---|
| (1 SET OF ENTRIES PER XSL) | (XSLMAX SETS OF ENTRIES) |

| TBL IXPSL | | TBL PSL | | |
|---|---|---|---|---|
| XSLNV | $(XSL_1)$ | — | | $\}$ IF(x)=$(XSL_i)$ |
| $ISLP_e$ | $(XSL_1)$ | — | | HERE(x)=XSLMAX |
| $ISLP_o$ | $(XSL_1)$ | $IXT_e$ | (x) | |
| $SLIXT_e$ | $(XSL_1)$ | $IXT_o$ | (x) | |
| $SLIXT_o$ | $(XSL_1)$ | $XP_e$ | (x) | |
| | | $XP_o$ | (x) | |
| XSLNV | $(XSL_2)$ | $IP_e$ | (x-1) | |
| $ISLP_e$ | $(XSL_2)$ | $IP_o$ | (x-1) | |
| $ISLP_o$ | $(XSL_2)$ | $IXT_e$ | (x-1) | $\}$ (x-1)∗$(XSL_i)$ |
| $SLIXT_e$ | $(XSL_2)$ | $IXT_o$ | (x-1) | |
| $SLIXT_o$ | $(XSL_2)$ | $XP_e$ | (x-1) | |
| | | $XP_o$ | (x-1) | |
| XSLNV | $(XSL_3)$ | | | |
| ... | | | | |
| XSLNV | $(XSL_n)$ | $IP_e$ | (x-j) | |
| | | $IP_o$ | (x-j) | |
| | | $IXT_e$ | (x-j) | |
| | | $IXT_o$ | (x-j) | |
| | | $XP_e$ | (x-j) | |
| | | $XP_o$ | (x-j) | |

FIG.7C

DIGITAL OVERSPEED CONTROLLER FOR USE IN A VITAL PROCESSING SYSTEM

BACKGROUND OF THE INVENTION

The present invention relates to vital processing systems, and particularly to a digital overspeed controller forming part of that larger system. An appreciation of the larger system can be gained by reference to copending applications Nos. 07/267,070 and 07/267,214, assigned to the assignee of the present invention, the details of the disclosures of which are incorporated herein by reference. In particular, FIG. 10 of Ser. No. 07/267,214 depicts the larger system in block form.

The invention is especially suitable for use in railway signalling and control systems which must be vital in their operation, that is, restricted to the safe or "off" state of each output which controls a signal, switch machine, or other signalling or control operation, unless the allowed or "on" condition thereof is enabled.

The present invention is an improvement in the subsystem or device known as a digital overspeed controller which forms part of a larger processing system and which, per se, has been known for the purpose of forming a variety of functions. One example of such a device is the governor disclosed in U.S. Pat. No. 4,495,578 assigned to the assignee of the present invention, the details of which disclosure are incorporated herein by reference.

In essence, the governor or governor means involved in U.S. Pat. No. 4,495,578 is responsive to a signal receiving means for receiving and registering wayside-imposed speed limits; it is also responsive to vehicle speed measuring means for imposing a braking force or a requirement for a braking operation on the vehicle if the vehicle speed is greater than the wayside-imposed speed limit, the improvement of that patent comprising the provision of speed profile generating means responsive to the signal receiving means for receiving a second speed limit at a time when a first, higher speed limit had been effective to generate a speed limit profile, the means for withholding application of the braking force, or the requirement therefor, being operative so long as the speed limit profile is generated and the vehicle speed is less than the current value of said speed limit profile.

In any event, all of the digital overspeed controllers known in the art are concerned with performing the following functions: interpreting the output pulses of a tachometer as speed and distance information; averaging the tachometer data to eliminate spurious "jumps" in speed, while retaining adequate speed response; reading manual wheel size" switches to determine wheel size; adjusting averaged speed information using wheel size to determine actual train speeds; inputting externally generated speed limit information; and determining if train speed is under the effective speed limit.

Although it has been known previously to employ the noted microprocessor-based speed governors, or over/underspeed controllers of one type or another, these have been so designed that the probability of a "wrong-side failure" has not had a calculable upper bound. Consequently, there is some degree of uncertainty or insecurity present in the operation of such previously known devices or subsystems.

Accordingly, it is a fundamental object of the present invention to provide a microprocessor-based digital overspeed controller which is so designed and constructed that the probability of a "wrong-side failure" has a calculable upper bound. Hence, one can be sure, within such statistical bound, that a combination of failures will not produce a real threat to vehicle safety.

SUMMARY OF THE INVENTION

The above and other fundamental objects of the present invention are achieved by applying the notion of so-called Numerically Indicated Safety Assurance Logic to the design of each of the functions required to be performed by the digital overspeed controller, thereby to allow the calculation of the requisite upper bound, aforenoted, to the probability of a wrong-side failure.

The notion noted above, i.e., Numerically Integrated Safety Assurance Logic, will be more fully explained hereinafter. However, there are essentially two basic concepts applied to the implementation of each of the functions performed in a digital overspeed controller. These concepts, namely "diverse channels" and even-/odd system cycles are also defined hereinafter. In hardware terms, two tachometers are associated with system cycle generation. The tachometers are arranged to be totally independent and are assumed to be identical in the sense that they produce exactlY the same waveforms. Speed averaging is performed to smooth the tachometer output data, and an algorithm is employed to average the two tachometer counts. Moreover, means are provided for determining wheel size, including a switch arrangement for insuring that settings cannot be inadvertently changed to reflect a wheel size smaller than that manually set. Means are also provided for adjusting the measured train speed by operations performed on each channel so as to adjust the averaged tachometer data to account for wheel size. Additional operations, which will be described in detail hereinafter, result finally in the verification of "safe speed", which proves that the current average speed of the train is less than or equal to the current effective speed limit.

It should be especially noted that a unique vital profile speed limit generator is included in the system for purposes which will be explained in detail hereinafter. Essentially, such means assures that the functions to be performed are done correctly by vitally proving that the profile does not start at a speed greater than that of the previous high, "external", speed limit; and that the profile decrements at a rate equal to or greater than the minimum braking rate specified. Such proof is implemented by both a primary and a secondary profile generation.

Other and further objects, advantages and features of the present invention will be understood by reference to the following specification in conjunction with the annexed drawing, wherein like parts have been given like numbers.

DESCRIPTION OF DRAWING

FIG. 7C shows another set of profile generation primary loop tables.

DESCRIPTION OF PREFERRED EMBODIMENT

Figure 1:
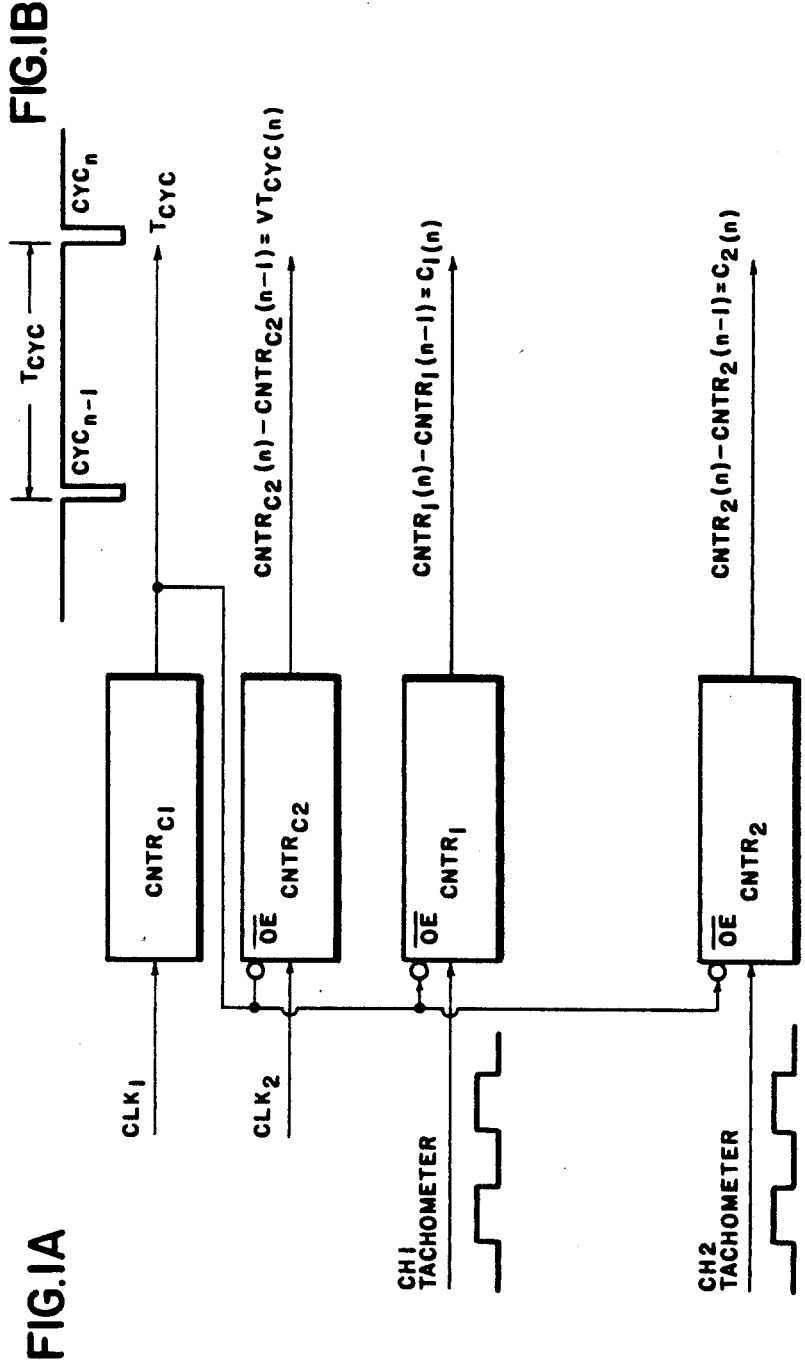
FIG. 1A is a functional block diagram illustrating the tachometer counters in the system cycle generation means.
FIG. 1B is a diagram of the system time denoted $P_{cyc}$.

As the description proceeds, it will be perfectly apparent to those skilled in the art that the various functional block diagrams depict a variety of means for accomplishing the required functions in the system. It will be further appreciated that these means can take the form of either discrete hardware components in certain instances; or in other cases, the equivalent in the form of a programmed microprocessor for realizing the functions called for.

DESCRIPTION OF THE FUNCTIONS TO BE PERFORMED

A digital overspeed controller comprises several functions. Each must be designed such that the integrity of the information created or operated on by the function cannot be compromised. This requirement is imposed on the system because of the vital nature of the device. The functions to be performed are:

a. Interpret the output pulses of a tachometer as speed and distance information.

b. Average the tachometer data to eliminate spurious 'jumps' in speed, while retaining adequate speed response.

c. Read manual 'wheelsize' switches to determine wheel size.

d. Adjust averaged speed information using wheel size to determine actual train speed.

e. Input externally generated speed limit information.

f. Determine if train speed is under the effective speed limit.

g. Generate a speed limit profile which has a shape determined by the minimum braking capacity of the train. Decrement the speed limit profile at the predetermined rate as a function of distance traveled. The speed limit profile is invoked only when the externally generated speed limit changes from a higher to a lower limit.

The 'effective' speed limit internal to the controller is the greater of either the externally generated limit or the internally generated profile.

DEFINITION OF TERMS

The following terms are defined within the context of this disclosure.

Wrongside Failure

The failure of any hardware component leading to a situation which is actually or potentially unsafe. 'Potentially' is used here to account for those situations in which a particular set of external circumstances may be required to produce an unsafe result. In this context, an unsafe situation is one in which a more permissive output is produced than would have been produced in the absence of the failure.

Vital

A characteristic of a function or an operation which requires it to operate safely, i.e. with an acceptably low probability of wrongside failure in the event of a hardware failure.

Also, a characteristic of a system or device which enables it to operate with an acceptably low probability of a wrongside failure in the event of a hardware failure.

Nisal (Numerically Integrated Safety Assurance Logic)

A design concept applied to microprocessor-based systems which endows the system with certain characteristics:

1. The performance of a logical or numerical operation and its outcome are vitally represented by a unique N-bit numerical value. The value is constructed by the operation and only exists if the operation is successfully completed.

2. Application of NISAL to a microprocessor-based function requires that each and every operation necessary to be vital is accomplished in such a way that the operation is verified by the generation of the unique numerical value selected to represent the successful completion of the operation.

3. The probability of the correct N-bit numerical value being generated without the operation it represents being successfully completed can be shown to be less than or equal to some fixed value. This fixed value is called the 'probability of a wrongside failure' (PWF).

Polynomial Division

Polynomial division as used here is defined as the division of an N-bit binary number by a primitive polynomial (P) of degree N. This operation produces two results, a quotient Q and a remainder R.

Values A, B, and C can be combined together using polynomial division as follows:

A is divided by P resulting in R(A). R(A) is x'ORed with B and the result is divided by P, giving R(AB). R(AB) is x'ored with C and divided by P giving R(ABC) and Q9ABC), either of which may be used as the final result.

A property of polynomial division as described above is that if any or all of the three values A, B, or C are in error, the probability that the result R(ABC) (or Q(ABC)) would be correct is essentially $\frac{1}{2}**N$ (1 in 2 to the Nth power). This is due to pseudo-random properties of division by a primitive polynomial.

Preconditioning

In the example above, parameter values A, B, and C were combined via polynomial division to form results R(ABC) and Q(ABC). The numerical values of R and Q would thus be determined solely by the numerical values of A, B, and C. If it is required that either R(ABC) or Q(ABC) be a predetermined value, then the polynomial division process could be 'preconditioned' by first x'oring the A parameter with a 'preconditioning constant', whose value is such that the result (R(ABC) or Q(ABC) would be the predetermined value only if A, B, and C were correct.

Note that the use of preconditioning does not affect the integrity of combining values via polynomial division.

DESCRIPTION OF IMPLEMENTATION

The implementation of each of the functions listed in the problem description are described below; however, there are two concepts which should be described first. These are "Diverse Channels" and "Even/Odd system cycles".

Diverse Channels

There are two "channels" maintained throughout the overspeed controller. They begin with two independent tachometer inputs and all of the functions described below show operations performed on each of the two channels separately. The numerical results for each of the channels are different. It will be shown that the numerical difference between the two channels is used to prove the integrity of the functions described. The channels are denoted CH1 and CH2, and the 1 and 2 subscripts used in variable names refer to their respective channels (see FIG. 1A).

Even/Odd System Cycles

The "system cycle time" is denoted Tcyc (FIG. 18) and is nominally 100 msec. All of the functions are performed each system cycle. In order to be able to vitally distinguish data results between adjacent cycles, the cycles are denoted EVEN and ODD and results of each of the operations produce different numerical values on EVEN and ODD cycles. Variables and result values associated with EVEN cycles are denoted with subscript "e", while those associated with ODD values are denoted with subscript "o".

A TACHOMETER INPUT

There are two tachometers, CH1 TACHOMETER and CH2 TACHOMETER. The tachometers are independent and assumed to be identical. Independent in the sense that they have no common failure modes and are kept physically separated in all respects except for common power feeds which are themselves kept physically separate up to their point of connection at the system power source. Identical in that, for the purpose of this description, they produce exactly the same waveforms.

Each tachometer outputs an approximately square waveform, as seen in FIG. 1A, whose frequency is proportional to train speed based on PFREQ, a constant. The units of PFREQ are HZ/MPH.

FIG. 1B shows how the tachometer waveforms are transformed into counts per period Tcyc, where Tcyc is the system cycle time and is nominally 100 msec. The tachometer pulses increment counters CNTR1 and CNTR2 on the positive edge of each pulse. The counters are read at 100 msec intervals, Producing counts C1(n) and C2(n) respectively for system cycle "n". We will assume for purposes of this explanation that C1(n) and C1(n) are identical.

Again, CNTR1 and CNTR2 are independent, read via different bus structures, etc., so that C1(n) and C2(n) are also independent.

It is evident that time Tcyc is critical. It must be shown that CNTR1 and CNTR2 are read at exactly 100 msec intervals to prove that the speed calculated from C1(n) and C2(n) is accurate The independent clocks CLK1 and CLK2 in FIG. 1 are used for this purpose. CLK1 determines the system cycle time TCYC, and CLK2 creates an independent check on the cycle time. The difference in counts in CNTRc2 from cycle "n−1" to cycle "n" should be an exact N-bit value. This value, VTcyc, is combined with other factors to form the Safe Speed Verification value VSSe/o. (See section F below).

B. SPEED AVERAGING

Figure 2:
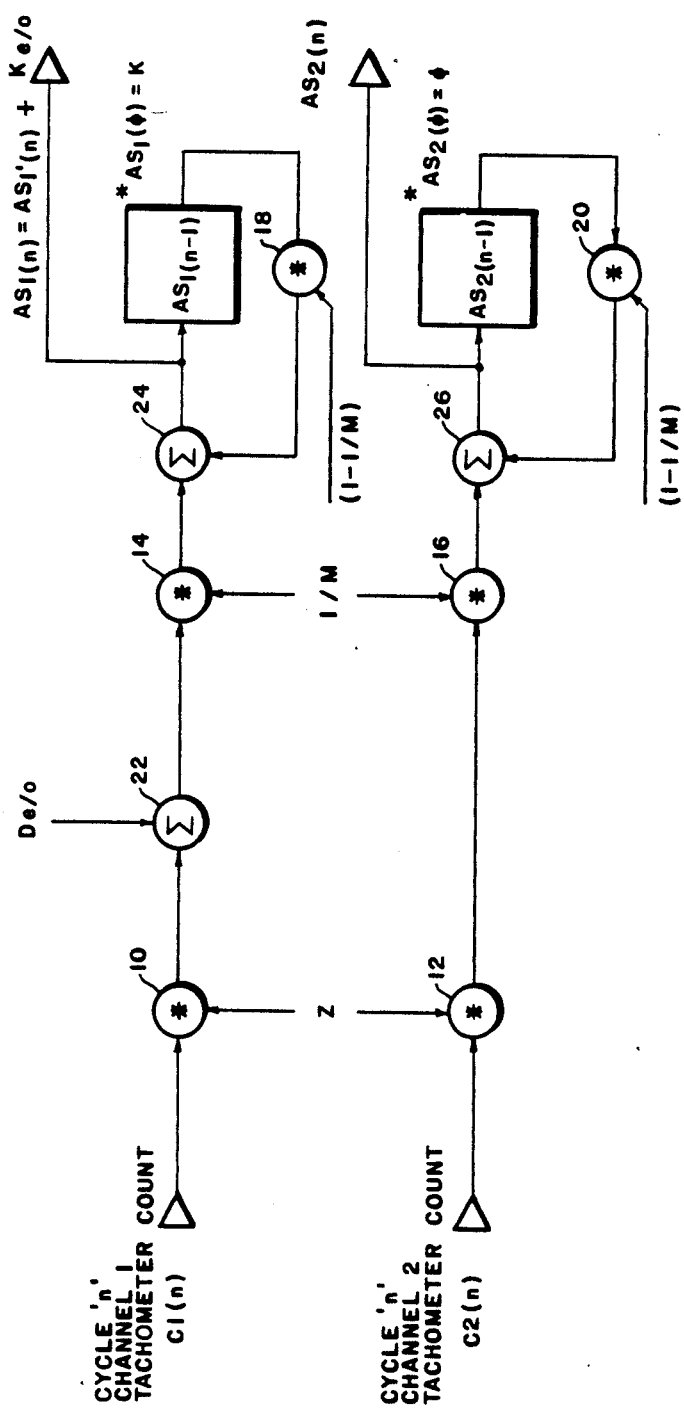
FIG. 2 is a functional block diagram depicting the averaging of tachometer counts from the independent tachometer channels.

Averaging is done to smooth the tachometer output data C1(n) and C2(n). FIG. 2 shows the result of using an algorithm to average the two tachometer counts C1(n) and C2(n). The algorithm is implemented by means of the multipliers 10, 12, 14, 16, 18, and 20, and adders 22, 24, and 26, or through corresponding programming of a suitable microprocessor to achieve such operations. Note the two distinct channels, CH1 and CH2. Input to channel 1 is the tachometer count C1(n) while input to channel 2 is tachometer count C2(n).

AS2(n−1) is the average speed in CH2 as calculated on cycle (n−1). AS2(n) for the current cycle is calculated as:

$$As2(n) = (C2(n)*Z)/M + AS2(n-1)*(1-1/M)$$

where:

Z = an arbitrary multiplication factor used to avoid losing significant digits when dividing C2(n) by 'M'.

M = an integer such that 1 "Mth" of the current cycle's count (C2(n)) is added to (M−1) "Mth's" of the previous cycle's average.

It is necessary, however, to prove that the "average" operation has been performed on both channels. FIG. 2 shows a numerical "tag" in the form of De/o added to the C1(n)*Z value in CH1. De is added on EVEN cycles. Do on Odd cycles. The values selected for De/o have the following constraints:

define: $K$ = integer multiple of $M$.
$K$ = initial value of $AS1(0)$ at $n+0$.

then: $De = 2KM - K$
$Do = -2KM + K$ $AS1(n) = (C1(n)*Z + De/o)/M + AS1(n-1)*(1-1/M)$ Conclusion: $AS1(n) = AS1'(n) + Ke/o$ where: AS1'(n) = actual average CH1 speed without the Ke/o "tag".
Ke = K
Ko = −K.

At this point, the numerical difference between the two channels is Ke/o. If this difference exists during all cycles, dynamically changing from Ke to Ko to Ke etc. on consecutive cycles, it proves that:

a. The averaging operation has been correctly performed in each channel.
b. The tachometer counts C1(n) and C2(n) were equal.

C. DETERMINE WHEEL SIZE

Train speed may be calculated (in MPH) as AS2(n)/((PFREQ(hz/mph)*Tcyc), however this would be at nominal wheelsize, WW0. There are 16 wheel size values, each indicating a wheel size some number of units smaller than nominal, requiring that the train speed be multiplied by some proportional fraction.

The first task is to construct a switch arrangement which cannot inadvertently change settings to reflect a wheel size smaller than that manually set.

The second task is to read the switch to determine the wheel size and then prove that the switch has been read correctly.

Wheelsize Switch Configuration

Figure 3:
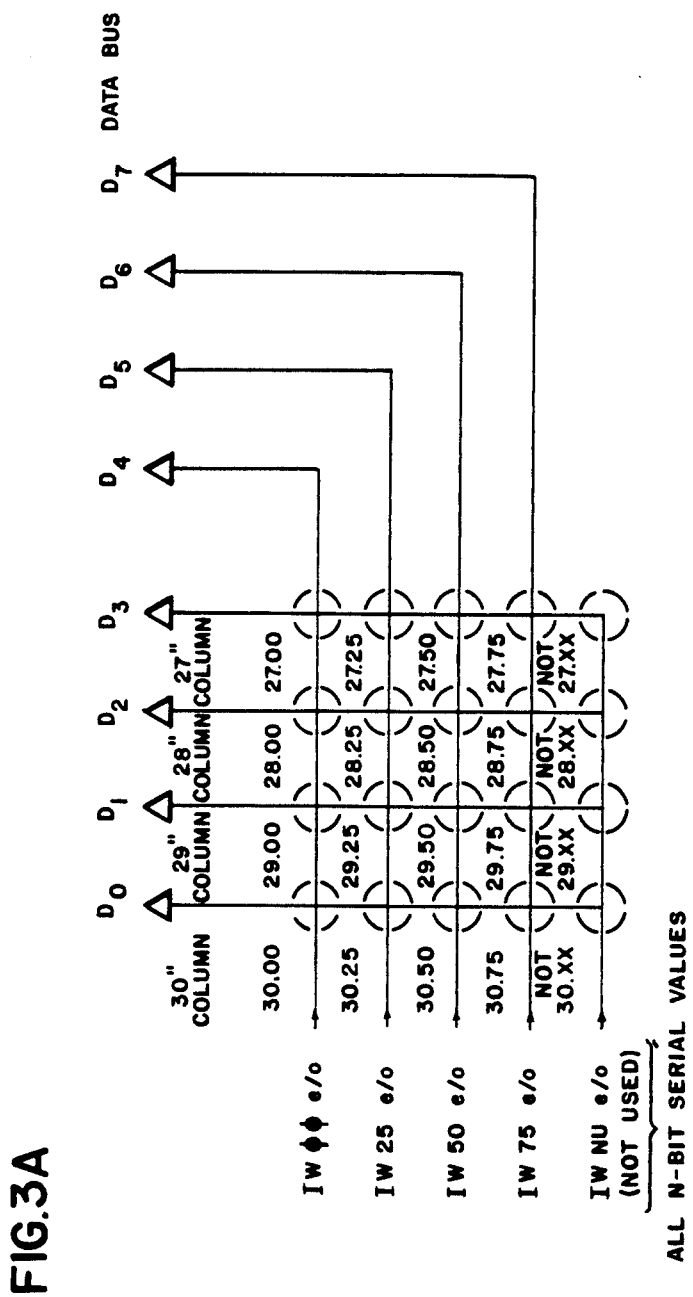
FIG. 3A is a diagram of a wheelsize switch arrangement.
FIG. 3B provides wheelsize switch returned data.

FIG. 3A shows the wheel size switch arrangement. There are 4 columns and 5 rows in the switch pattern. Each column represents a range of values and the first 4 rows represent $\frac{1}{4}$ of the range. The fifth position in each row represents the "not used" position. A mechanical connection can be made at the intersection of each column and row. One and only one position in each column must have a connection. Three columns must have connections in the "not used" position, while one column should have a connection made in one of the valid range positions.

An example is given in FIG. 3A. Here the columns represent 1 inch ranges, 27", 28", 29", and 30", while the rows represent $\frac{1}{4}$ inch increments.

Thus column 1 would have values of 30.75", 30.50", 30.25", 30.00" and "not used" at the intersections of its rows. Likewise, column 2 would have values 29.75", 29.50", 29.25", 29.00" and "not used", and so on for columns 3 and 4. The default wheelsize would then be 31.00 inches.

Reading the Wheelsize Switch

Five N-bit binary values are used to read the wheelsize switches. They are denoted: IW00, IW25, IW50, IW75, and IWNU. These values are written serially onto the 5 switch rows (see FIG. 3A). The 4 columns are connected to the CPU data bus and read serially. In addition, the first 4 rows are connected directly to the data bus, bypassing the switch. The data is collected from the data bus and combined via polynomial division. The resulting value is a unique representation of the wheelsize only if one and only one connection is made in the valid range portion of one column and all other columns have a "not used" connection.

FIG. 3B shows the values returned on the 8 data bus bits for each valid wheelsize switch configuration. Note that the default value is all "not used", which results in the nominal wheelsize WW0. There are thus 17 valid wheelsize values, including the default value. They are denoted WW0, WW1, WW2, . . . , WW16.

The value WWi (i=0, 1, 2, . . . , 16) is a vital representation of the wheelsize switch position. That is to say that no individual failure (or set of non-simultaneous failures) could cause the result (i.e. the combination via polynomial division of the set of N-bit values read through the switch) to be one of the set (WWi) other than the one representing the position actually set with a probability greater than that of WWi being created randomly. That probability is at most 16/2\*\*N.

This statement is true for all incorrect settings as well as failures of the switch hardware, bus hardware, etc. Note that the statement above concerning sets of non-simultaneous failures implies that single failures in the set are detectable.

The wheelsize switches must also be read non-vitally to determine which position (0, 1, 2, . . . , 16) is selected. This is done by setting the "not used" row to 0 and the other rows to 1, determining the column selected. Then the first 4 rows are set to 0 one at a time until the selected column becomes 0, determining the row position selected within the column. This value is denoted WSNV, where WSNV=0, 1, 2, 3, . . . , 16.

Thus the wheelsize is given by WSNV, and the value WWi provides vital confirmation of WSNV.

In addition, the values WW1 are made to be different on EVEN and ODD cycles. WWi is actually designated WEie or WWio. These values are constructed from two sets of "initial" values IW00e/IW00o, IW25e/IW25o. etc.

D. Adjust Speed Using Wheelsize

Figure 4:
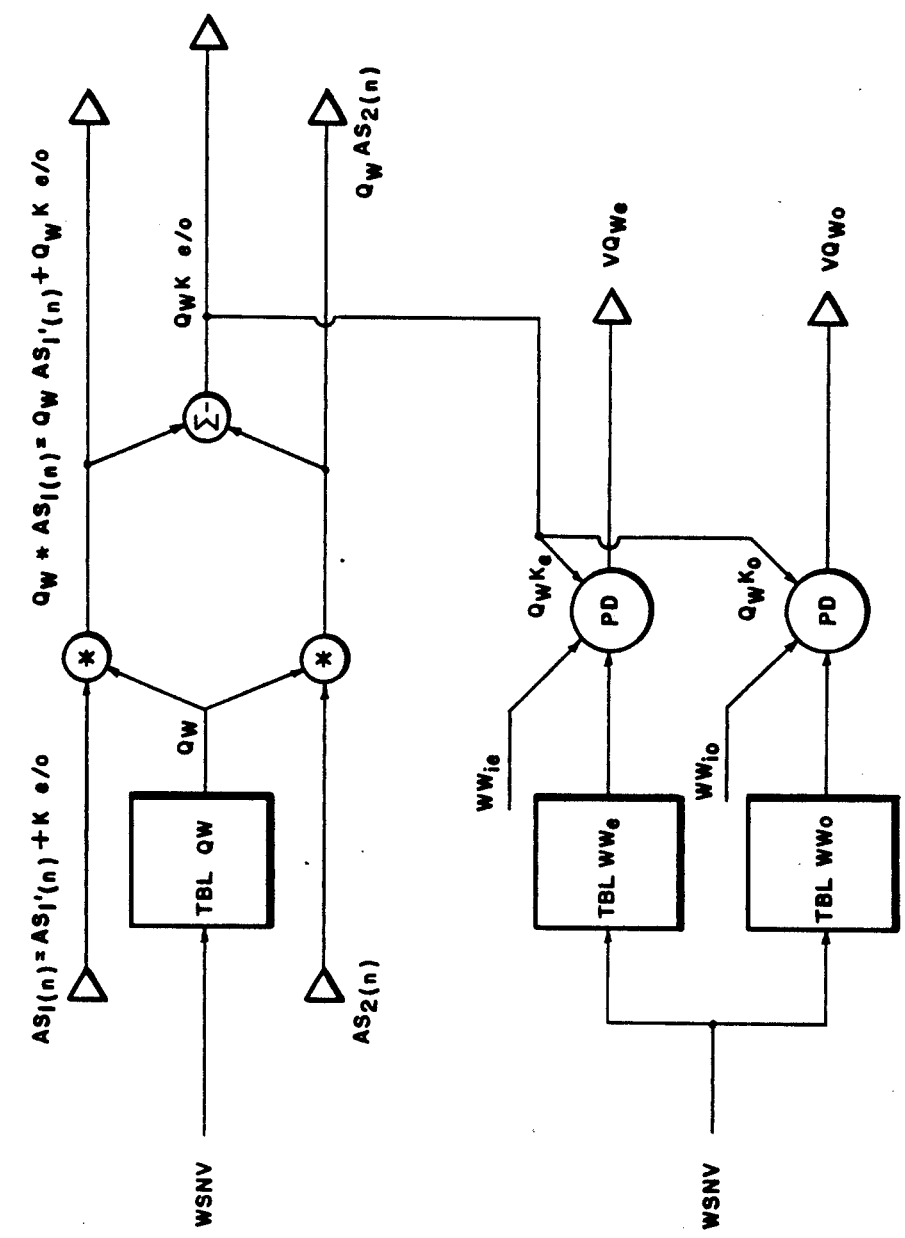
FIG. 4 is a functional block diagram of a wheelsize multiplier verification scheme.

FIG. 4 shows the operations performed on each channel to adjust the averaged tachometer data to account for wheelsize. The first operation is finding the "fractional" multiplier QW based on the non-vital representation of wheelsize, WSNV. A table of 17 values (TBLQW) is accessed using WSNV to select the proper table entry. The entry is a fraction which has been multiplied by an arbitrarily selected integer WWMULT, so that:

QW+int{WWMULT*(WSNV wheelsize)/(nominal wheelsize)}

This procedure makes QW an integer value. This is necessary if the difference between the two channels is to be kept to an exact integer value.

After multiplication,
CH1 = $QW*AS1(n)$ + $QW*AS1''(n)$ + $QW*Ke/o$
CH2 = $QW*AS2(n)$ Next the difference between the two channels is found by simple subtraction, and should equal QW*Ke/o, i.e. QW*Ke if the cycle is EVEN, QW*Ko if ODD.

The next operation is to form a vital verification value VQe/o. VQe/o is the combination (via polynomial division) of the channels difference QW*Ke/o), the vital wheelsize confirmation value (WWie/o), and a normalization value selected from EVEN/ODD tables TBLWWe/o which preconditions the polynomial division such that the result will have the preselected numerical values chosen for VQWe/o only if:

a. The multiplication factor QW selected from TBLQW corresponds to WWi.
b. Each channel was multiplied by QW.
c. Before multiplication, the channels differed by Ke/o, thus proving that the tachometer input data for each channel was averaged.

Note that VQWe/o is independent of "i", i.e. there is only one value for VQWe, regardless of which wheelsize is selected. Likewise for VQWo.

The above operations adjust the train speed to a speed less than that indicated by the tachometer data alone (if the wheelsize was other than nominal). This operation would, if done in error, make the train appear slower than it actually is, obviously a wrongside failure.

However, if the verification value VQWe/o has the correct value, then the probability that the train speed represented by the value in CH2 is less than actual train speed, (given that the wheelsize switch has been accurately set) is no greater than 16/2\*\*N. Note here that all data combined to construct VQWe/o are N-bits in length.

E. Input External Speed Limit

Figure 5:
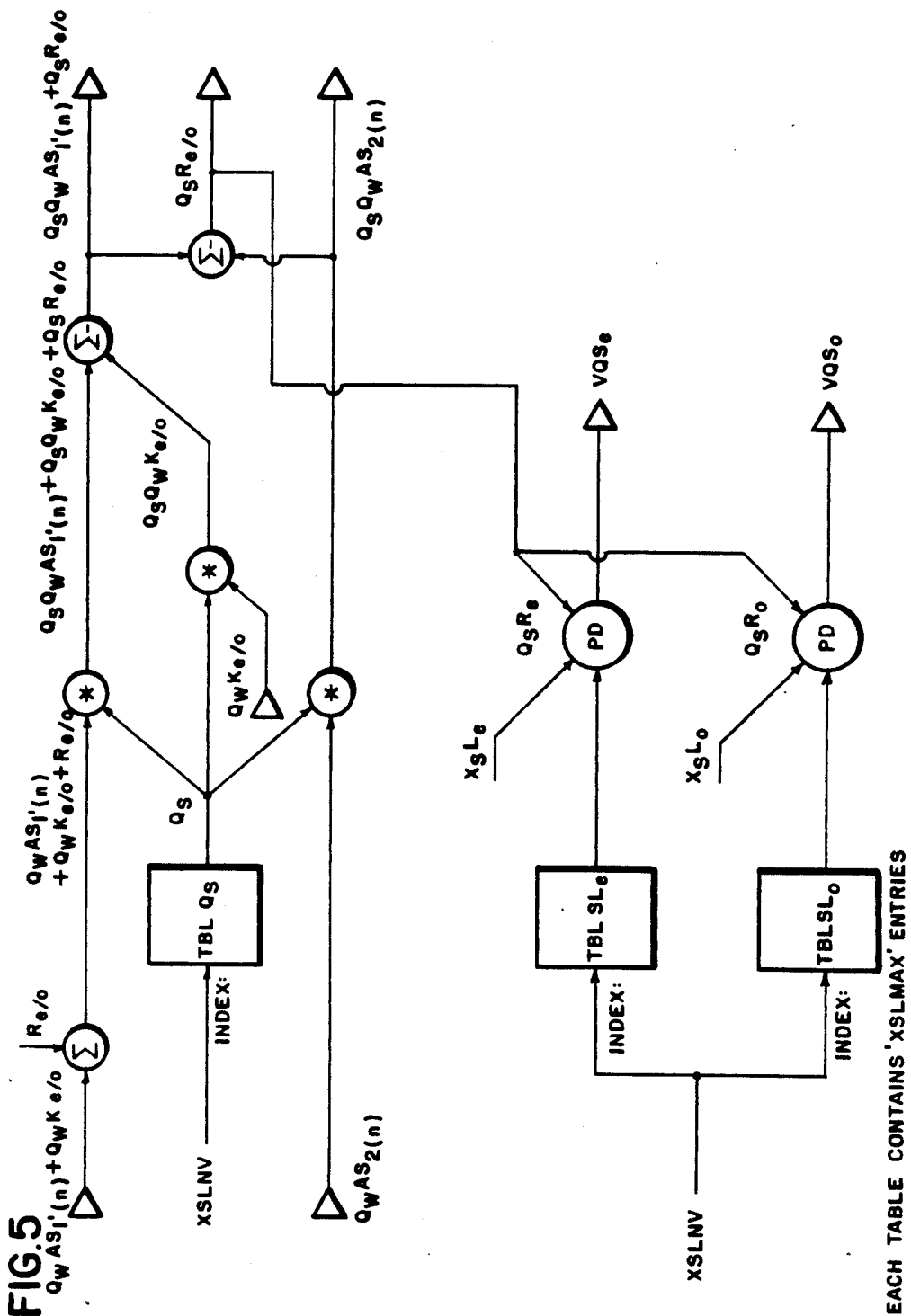
FIG. 5 is a functional block diagram of a speed limit multiplier verification scheme.

Referring to FIG. 5, external speed limit information is required to have the following form: XSLNV, XSLe on EVEN cycles, and XSLNV, XSLo on ODD cycles. XSLNV is a non-vital representation of speed limit, consisting of an integer number representing speed limit in 1 mph increments.

XSLe is a vitally created N-bit value, confirming the value XSLNV on EVEN cycles. XSLo does likewise on ODD cycles.

No special precautions are required to input the speed limit data, other than one input, XSLe/o cannot be saved from cycle to cycle, but must be overwritten by the next cycle's value.

F. Generate Safe Speed Verification

Figure 6:
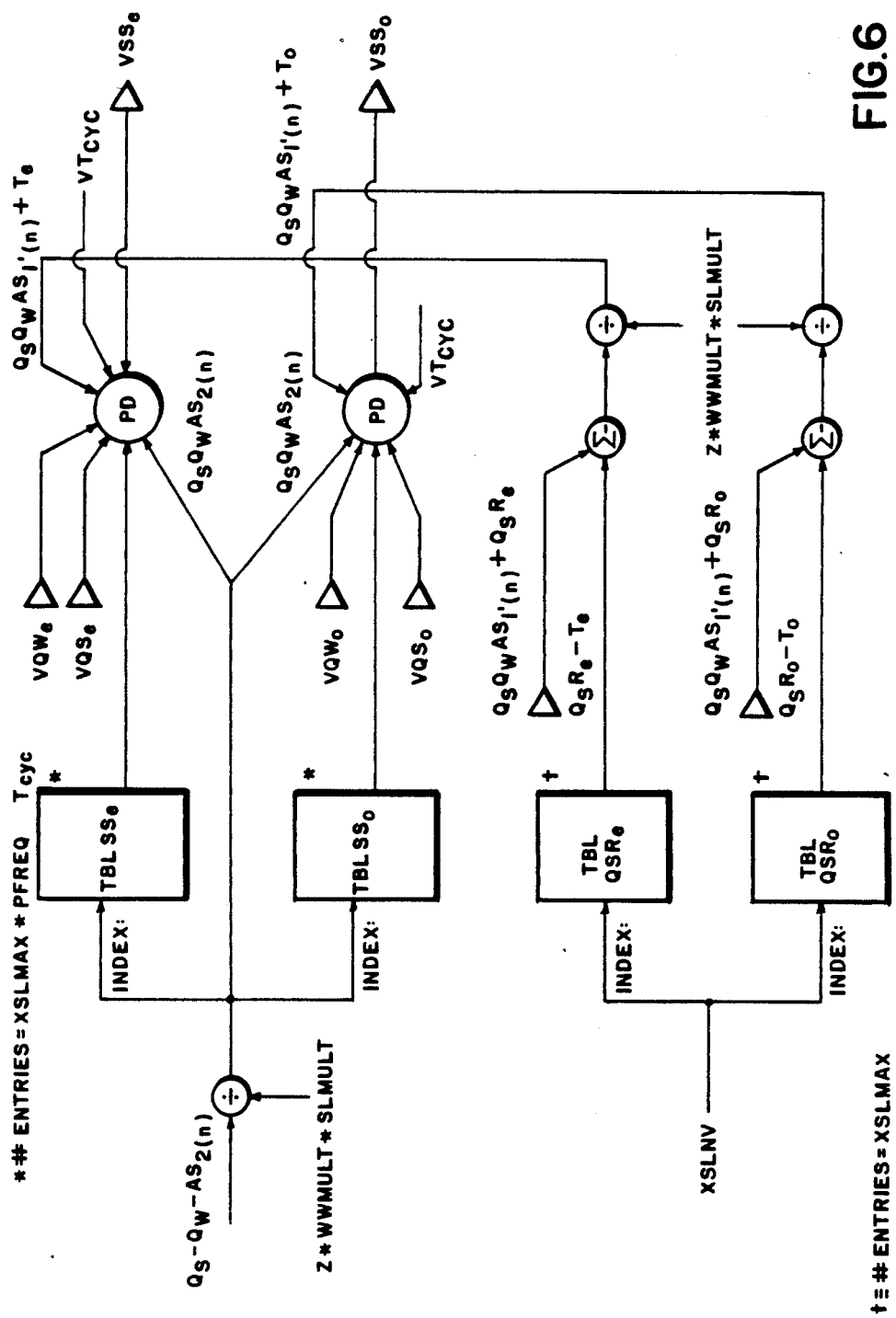
FIG. 6 is a functional block diagram of a safe speed verification scheme.

Referring to FIG. 6, safe speed verification (VSSe/o) is generated only if the averaged adjusted (for wheelsize) train speed is less than the "effective" speed limit. In the case considered here, the effective speed limit is XSLNV.

There are two operations performed: multiply the averaged train speed by a factor ($>=1$) which adjusts the speed as a function of the current speed limit, then create VSSe/o if the adjusted speed is less than or equal to a predetermined threshold.

Multiplication By Speed Limit Factor QS

Multiplication of the averaged speed by a factor proportional to the ratio (QS) of the effective speed limit and the maximum speed limit allows comparison of the result to the maximum speed limit as a fixed threshold for determining whether the train is under the effective speed limit.

As an example, if the max speed limit were 150 mph, the current speed limit were 50 mph and the averaged speed were Xmph, then if X were multiplied by QS=150/50=3, the value 3X could then be compared to 150 to determine whether an underspeed condition exists. This allows comparison to a fixed threshold, independent of effective speed limit. It must be proved, however, that the average speed has indeed been multiplied by QS and that the value of QS corresponds to that of XSLMAX/XSL.

FIG. 5 shows the values of the two channels before and after multiplication by QS and the generation of VQSe/o as vital verification of the operations including QS.

FIG. 5 shows the initial values of CH1, CH2, and the difference between channels, CH1−2, as follows:

$$CH1 = QW^*AS1(n) = QW^*AS1'(n) + QW^*Ke/o$$
$$CH2 = QW^*AS2(n)$$
$$CH1\text{-}2 = QW^*Ke/o$$

The constant Re/o, an arbitrary integer value, is added to CH1 in much the same way as De/o was added. Re/o serves ad a "tag" to test the multiplication of each channel by QS. Here the value of CH1 is:

$$CH1 = QW^*AS1(n) + Re/o = QW^*AS1'(n) + QW^*Ke/o + Re/o$$

The multiplication factor QS is selected from the table TBLQS (FIG. 5) by using XSLNV as an index. Since there is one QS value for every possible speed limit, and the possible speed limit values are from 1 mph to XSLMAXmph in 1 mph increments, there are XSLMAX QS values. The value of QS is actually:

$$QS = (XSLMAX/XSL)^*SLMULT$$

where:
XSLMAX = maximum speed limit value
XSL = current external speed limit
SLMULT = arbitrary integer multiplier CH1, CH2, and CH1−2 are multiplied by QS, so that:

$$CH1 = QS^*QW^*AS1(n) + QS^*Re/o =$$
$$QS^*QW^*AS1'(n) + QS^*QW^*Ke/o + QS^*Re/o$$
$$CH2 = QS^*QW^*AS2(n)$$
$$CH1\text{-}2 = QS^*QW^*Ke/o$$

CH1−2 is then subtracted from CH1, giving:

$$CH1 = QS^*QW^*AS1(n) + QS^*Re/o -$$
$$QS^*QW^*Ke/o = QS^*QW^*AS1'(n) + QS^*Re/o$$

Now the difference between the two channels is found to be:

$$CH1-2 = QS^*Re/o \text{ (assuming } AS1'(n) = AS2(n)).$$

The operations involving QS must now be verified. It must be proven that QS was chosen correctly (i.e. corresponds to the current XSL), and that both channels have been multiplied by QS.

This is accomplished by forming the QS verification value VQSe/o by combining CH1−2, XSL and a normalization factor to produce the fixed unique values VQSe/o on the appropriate EVEN/ODD cycle.

The normalization constant is selected by indexing the appropriate EVEN/ODD normalization table (TBLSLe/o) using XSLNV. XSLNV preconditions the polynomial division such that the result will have the preselected numerical values chosen for VQSe/o only if:

a. The multiplication factor QS selected from TBLQS corresponds to the current XSL.
b. Each channel was multiplied by QS.

The final operation is to form VSSe/o, the verification of safe speed which proves that the current averaged speed of the train is less than or equal to the current effective speeds limit. FIG. 6 shows how VSSe/o is formed in such a way that if the following operations result in the correct value of VSSe/o, it will include proof that:

a. VQWe/o and VQSe/o are correct.
b. The averaged train speed represented by the numerical values in each channel are identical.
c. The averaged train speed is less than or equal to the current XSL.

The operations required to form VSSe/o are as follows:

1. The value in channel 2 is actually:

$$CH2 = 9QS^*QW^*AS2(n)^*Z^*WWMULT^*SLMULT$$

The channel Z value is divided by Z*WWMULT*SLMULT to yield:

$$CH2 = QS^*QW^*AS2(n).$$

The channel 2 value has a maximum of XSLMAX*PFREQ*Tcyc possible valid integer values A set of tables, TBLSSe and TBLSSo, is provided, each of which contains an N-bit normalization factor for each possible integer value in Ch2. The integer numerical value of CH2 is also used as an index to access the corresponding normalization factor.

2. The value in channel 1 is actually:

$$CH1 = (QS*QW*AS1'(n)*Z*WWMULT*SLMULT +$$

$$QS*Re/o*SLMULT.$$

At this time, CH1 has XSLMAX*XSLMAX*PFREQ*Tcyc possible valid integer values. In order to reduce the number of values, a value equal to QS*Re/o*SLMULT − Te/o*Z*WWMULT*SLMULT is subtracted from CH1.

There are XSLMAX possible values for QS*Reo. A set of tables is constructed, TBLQSRe and TBLQSRo, containing all possible values of QS8Re/o*SLMULT −Te/o*Z*WWMULT*SLMULT, EVEN and ODD values respectively. These tables are accessed by using XSL as the index. After the substraction, CH1 has the value: CH1=(QS*QW(AS1'(n)+Te/o)*Z*WWMULT*SLMULT Ch1 is then divided by Z*WWMULT*SLMULT, giving:

$$CH1 = QS*QW*AS1'(n) + Te/o$$

Note that inclusion of the factor Te/o serves two purposes: first, the numerical values of the entries in tables TBLQSRe/o are not equal to QS*Re/o*SLMULT. Since the factor QS*Re/o is of vital consequence at the point in the process when the difference between CH1 and Ch2 is found, it would be possibly unsafe if that value were available in a table.

Second, the addition of Te/o in this way to the value of CH1 serves to keep the value in Ch1 distinguishable from that of Ch2. This is important in the next operation where the values in each channel are combined via polynomial division. If CH1 were not distinguishable from CH2, there would be no proof that CH2 was not used twice.

3. The next operation to be performed is the combining of five factors via polynomial division. FIG. 6 shows VQWe/o, VSWe/o, QS*QW*AS2(n) CH2's value), QS*QW*AS1'(n)+Te/o CH1's value), the system cycle time verification value VTcyc, and the normalization constant from TBLSSe/o. The result, VSSe/o, is a vital representation of the tact that the train speed is less than or equal to the current effective speed limit, XSL in this case.

C. Generate Vital Profile Speed Limit

Functionally, the speed limit profile generator must accomplish the following:

a. Initiate the speed limit profile only when the externally generated speed limit indicates a speed limit change from a higher to a lower limit.

b. Decrement the speed limit represented by the profile in 1 mph steps from the previous (higher) external limit to the current (lower) external limit.

c. Decrement the profile limit as a function of distance travelled at a rate which equals or exceeds the minimum braking capacity of the train.

This is to say that if the minimum braking capacity of the train were A mph/sec, then the profile limit would be decremented 1 mph after distance "d", where "d" is the distance travelled in 1/A seconds at the current profile speed limit.

For example, if A=2 mph/sec, and the external speed limit changed from 100 mph to 50 mph, the first profile limit would be 100 mph. The train could remain at 100 mph for ½ sec before it must be at a speed of 99 mph. The distance travelled at 100 mph for ½ sec would be (100/3600)/2=0.0138 miles=73.3 ft. This value can ultimately be converted into number of tachometer pulses, knowing PFREQ and the wheelsize.

In order to assure that the functions are performed correctly, it must be vitally proved that:

i. The profile does not start at a speed greater than that of the previous high external speed limit, and ii. The profile decrements at a rate equal to or greater than the minimum braking rate specified.

Figure 7A:
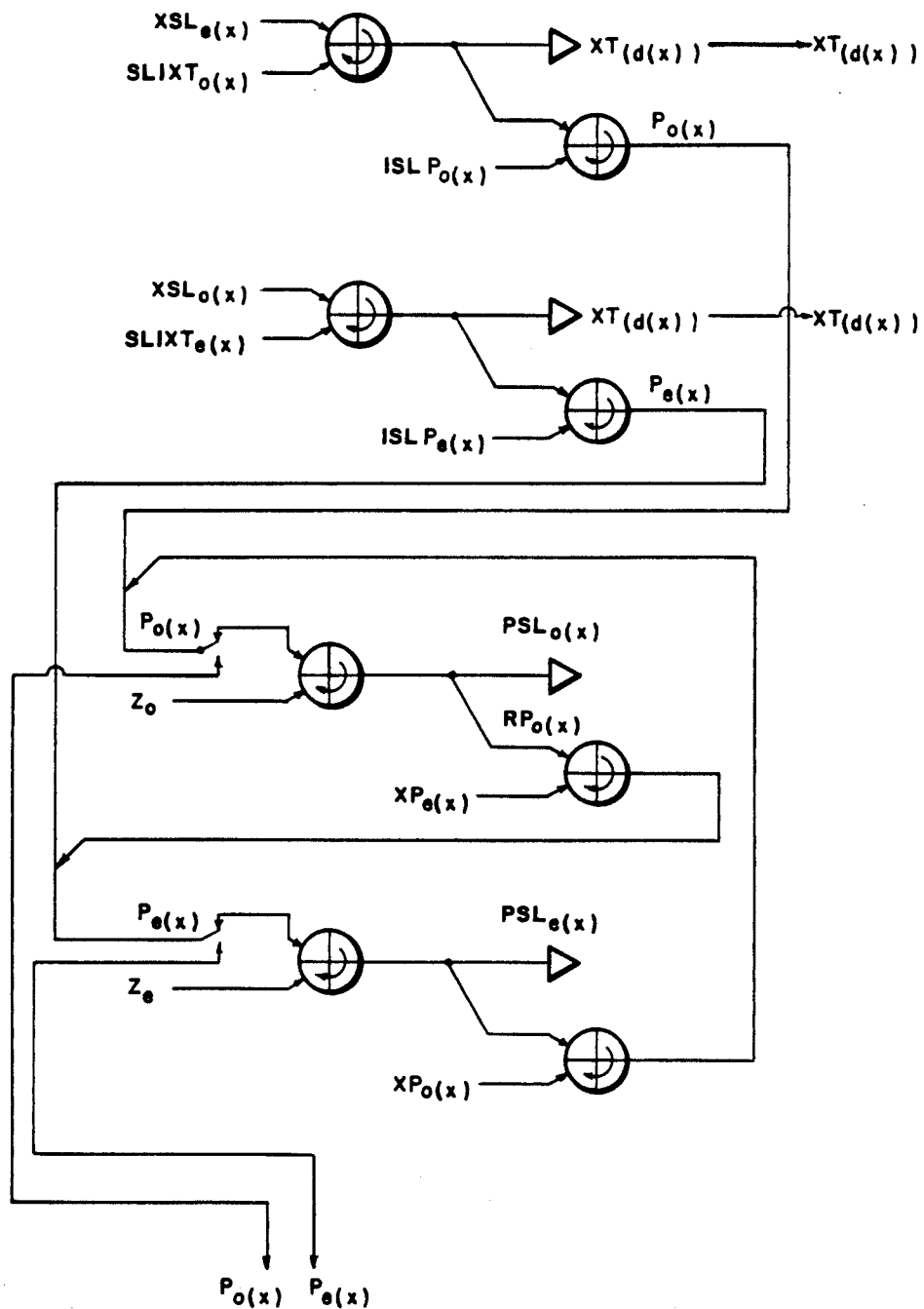
FIG. 7A is a functional block diagram of a profile generation primary loop.
Figure 7B:
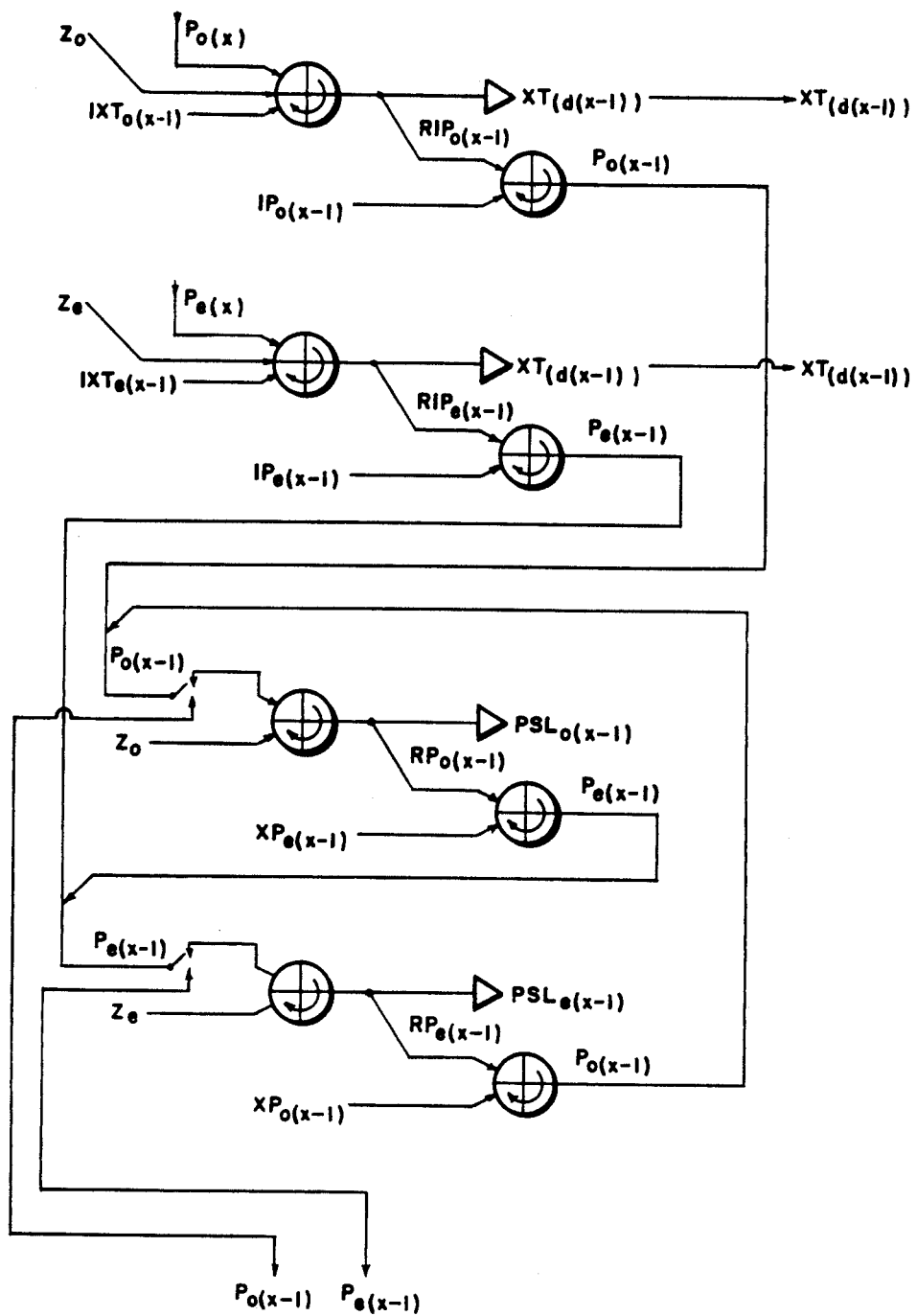
FIG. 7B is a functional block diagram showing the continuation of the loop illustrated in FIG. 7A.

FIGS. 7a, 7b, and 7c illustrate the primary profile generation operations.

Figure 8A:
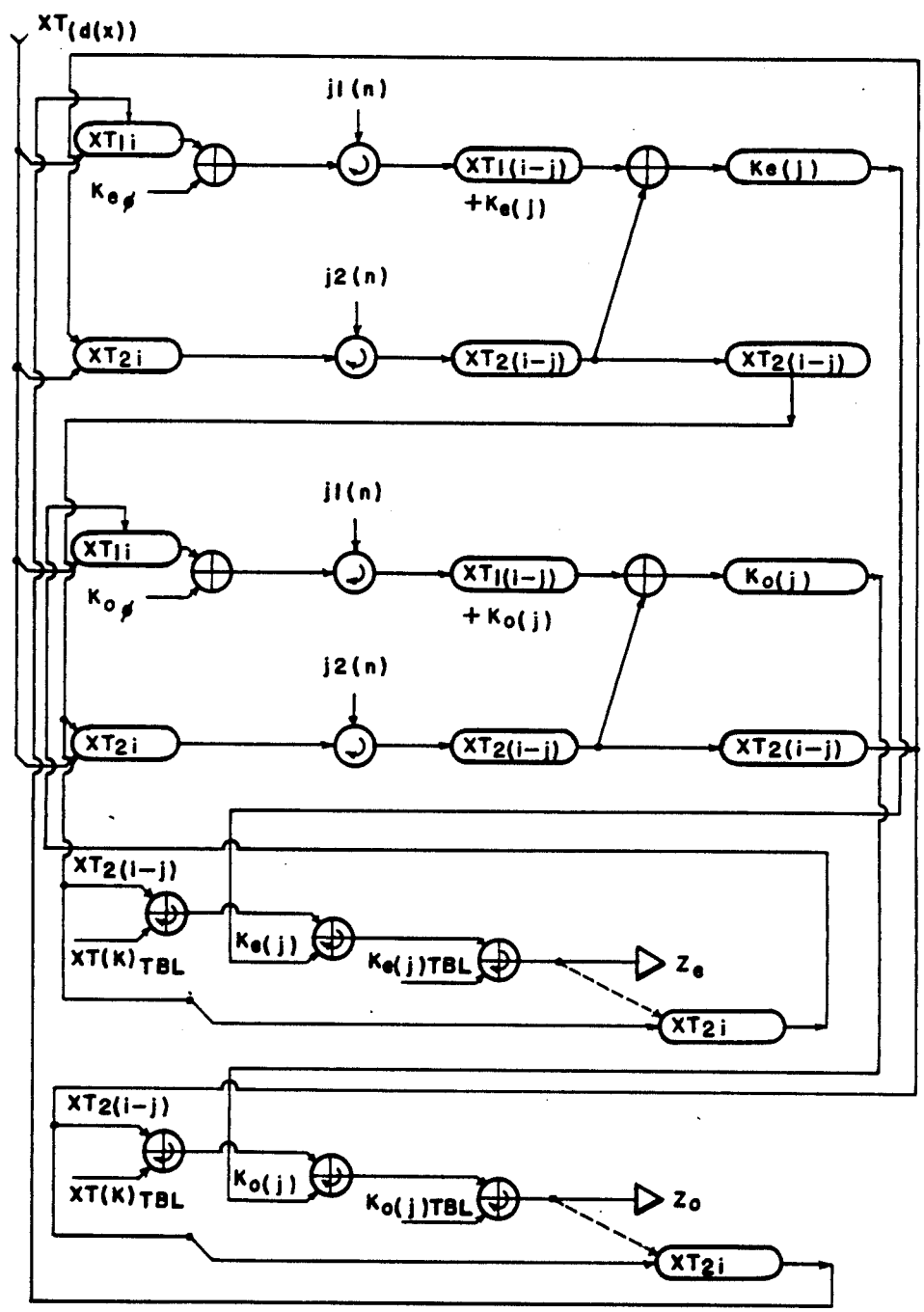
FIG. 8A is a functional block diagram of a profile generation secondary loop.
Figure 8B:
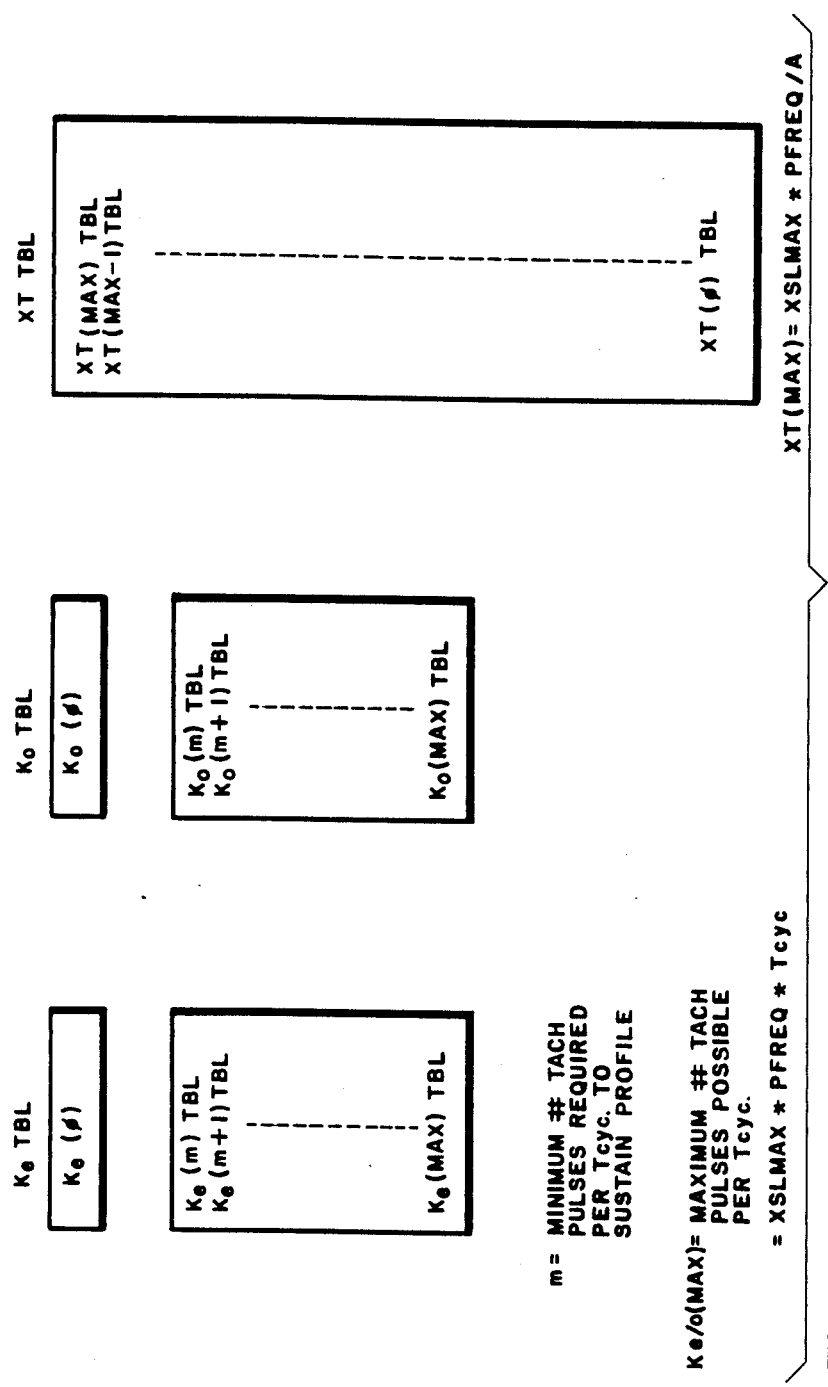
FIG. 8B is a number of profile generation secondary loop tables.

FIGS. 8a and 8b illustrate the secondary profile generation operations.

These operations will be explained using the example given above, where XSLe/o(n−1)=100 mph is also denoted as XSLe/o(n−1)(x) where "x=speed limit in mph (100 mph in this case).

PRIMARY PROFILE GENERATION OPERATIONS

1. FIG. 7a shows XSL(n−1)e(100) being combined with normalization constant SLIXTo(100) via polynomial division to form two results:

Quot. = $XT(d(100))$ where $d(100$ is distance allowed at 100 mph
Remainder = $RIPo(100)$.

XT(d(x)) is used in the secondary operations and will be explained later. XSL(n−1)e(100) is the external speed limit from the previous cycle (n−1) (which happened to be an EVEN cycle) and was the N-bit value representing 100 mph. The current cycle is ODD in this example, so the normalization constant SLIXTo(100) is extracted from the TBLIXPSL table (FIG. 7c). There is one set of normalization constants in table TBLIXPSL for each external speed limit.

The remainder result RPo(100) is then normalized by yet another value from table TBLIXPSL, ISLPo(100). RIPo(100) and ISPLo(100) are combined to form Po(100) as the remainder. Po(100) is then used to initialize the primary profile generation loop (FIG. 7a) which produces a legitimate profile speed limit PSLe/o(100) every Tcyc seconds until the train has travelled the distance "d(100)".

2. The primary profile generation loop operates as follows:

i. The loop is entered with a value Pe/o(x). Note, from here on, x will be used as the generalized current profile speed limit. Pe/o(x) is generated either from the profile initialization function described above, (i.e. beginning with a high to low XSL transition or from the manipulation of the Pe/o(x+1) value from the previous loop.

ii. Pe/e(x) is combined with Ze/o to form PSLe/o(x) (the actual profile speed limit) as the quotient result, and RPe/o(x) as the remainder result. Note that Ze/o is the output of the secondary profile generation operation described later) which proves that the train is travelling (accumulating distance) at some minimum rate, that both "distance accumulation" channels agree, and that the distance to decrement (d(x)) has not been exceeded.

iii. The normalization constant XPo/e(x) (note the opposite cycle sense) is then combined with RPe/o(x) to form as a remainder Pe/e(x) (i.e. Pe/o for the opposite sense); After Tcyc seconds, Zo/e will be formed again by the secondary operation, and the loop will repeat.

The primary loop will remain cycling until Ze/o can no longer be produced by the secondary operation (the distance d(x) has elapsed). At that time, Pe/o(x−1) will be generated as shown in FIG. 7b, and a new primary loop will be entered.

3. The generation of Pe/o(x−1) from Pe/o(x) (FIG. 7b) is as follows:

iv. Pe/o(x) is combined via polynomial division with normalization factor IXTe/o(x−1) and Ze/o (from the secondary profile generation operation) generated in the last loop for D9x), i.e. generated when the distance travelled equaled d(x).

v. The combination above results in XT(d(x−1)) as a quotient and RIPe/o(x−1) as the remainder. As before, XT(d(x−1)) is used to initiate a new secondary loop, while RIPe/o(x−1) is combined with normalization factor IPe/o(x−1) to from Pe/o(x−1), which is the initial value for the next primary loop.

vi. The new primary loop now consists of iterating steps i through iii above until the distance corresponding to the current profile speed limit (x−1) if travelled. The factor Ze/o from the secondary loop provides assurance every Tcyc cycle period that the distance has not yet been reached. When d(x−1) has been reached, steps iv and v above are repeated for the new limit, (x−2), and so on.

4. FIG. 7c shows the normalization tables. TBLIXPSL contains normalization values used for initializing the primary loop from some XSL speed limit after the limit changed from high to low. There are four entries per external speed limit.

TBLPSL contains normalization values used for initializing the primary loop when decrementing from one step in the profile to the next lower step. Each step represents 1 mph. Thus the number of sections in TBLPSL is equal to XSLMAX, and there are six entries per section.

SUMMARY OF PRIMARY OPERATIONS

A valid external speed limit XSL(n−1)(x) representing speed "x" is required to begin the profile. It, along with N-bit normalization factors, produce initial values for both primary and secondary loops (Pe/o(x) and XT(d(x)) respectively). It is important to note that the secondary loop initial value is keyed to enter the loop only where distance d(x) is required, and no other distance would be acceptable.

It is the task of the primary loop to keep the current profile speed limit value (PSLe/o(X)) valid and dynamically changing on even and odd cycles only while the secondary loop provides verification that the distance required to decrement PSLe/o(x) has not yet elapsed.

SECONDARY PROFILE GENERATION OPERATIONS

The secondary set of profile generation operations takes as an input XT(d(x)). This initial value allows the generation of alternating Ze/o values in the secondary loop until the train has traveled the distance d(x). To generate Ze/o, the operations must vitally assure that:

a. Some minimum number of tachometer pulses are received each Tcyc seconds.
b. The number of tachometer counts received in each of the two channels are equal.
c. The number of tachometer pulses accumulated while Ze/o remains valid cannot exceed d(x).

FIG. 8a shows the operations in schematic form. The steps are as follows:

(i) XT(d(x)) is inserted into separate buffers in CH1 and CH2. They are renamed XT1(i) and XT2(i), where the subscript "i" represents the number of tachometer pulses allowed to be accumulated before d(x) is reached. As the operation loops, "i" will decrease from its original value to "0".

(ii) The constant Ke/o(0) is x'ORed with XT1(i) in Ch1. The values in each channel are then shifted in a polynomial divider by the number of tachometer counts accumulated during cycle "n" in their respective channels. The number of CH1 tachometer counts is denoted j1(n), while CH2's is denoted j2(n). In the absence of failure, j1(n)=j2(n).

After shifting is complete, the two channels should differ by the value Ke/o shifted "j" times. Here CH2 is x'ORed with CH1 giving Ke/o(j) in Ch1. The value in CH2 (XT2(i)) after being shifted "j" times, is denoted XT2(i−j(n)). The counts j1(n) and j2(n) are proved to be equal by the fact that CH1−Ch2= KIe/o(j). If j1(n)<>J2(n), then CH1−CH2 would not produce a valid Ke/o(j) for any value of "j".

(iii) Ze/o is formed from the combination (via polynomial division) of Ke/o(j), TBLKe/o(j), XT2(i−j), and TBLXT (i−;). Note that there are a limited number of TBLKe/o normalization entries. To insure a minimum number (m) of tachometer pulses per cycle, there are no TBLEe/o(j) entries for j=1, 2, 3, . . . , m−1. Likewise, the normalization constants TBLXT(i−j) do not exist for (i−j)<0.

FIG. 8b shows the format of the secondary table TBLKe/o and TBLxt(k).

SUMMARY OF SECONDARY OPERATIONS

The formation of the N-bit values Ze/o on alternate system cycles (Tcyc) verify that the profile is being decremented correctly. Note that the information relative to the rate of decrease, which is in turn a function of "A", the minimum braking rate, is contained in the initial XT(d(x)) values created in the primary section. These values dictate how many tachometer pulses may elapse at a given speed "x" before the speed limit must be decreased by 1 mph.

At the point where the profile speed limit PSL(x) is equal to or less than the current external speed limit XSL(x), the profile is discontinued. This may be determined non-vitally, since if the profile continued to generate speed limit values, they would be lower than those allowed by XSL(x), and would not be a wrongside failure.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

What is claimed is:

1. A digital overspeed controller for use in a vital processing system to control vehicle motion, comprising:

signal receiving means for receiving and registering externally generated speed limits;

means for producing system cycle generation;

a pair of independent tachometers connected in independent channels to respective counters;

said tachometer counters and said system cycle generation means being operative to produce identical waveforms;

means for averaging the two independent tachometer counts;

means for adjusting the averaged tachometer counts to account for wheelsize;

means, responsive to said means for adjusting, for generating safe speed verification, such that verification is generated only if the current average train speed is less than the current effective speed limit;

vital profile speed limit generating means for initiating the speed limit profile only when said externally generated speed limits indicate a speed limit change from a higher to a lower limit.

2. A device as defined in claim 1, in which said vital profile speed limit generator includes means for decrementing the speed limit represented by the profile in small discrete steps from the higher, externally generated, speed limit to the current lower limit.

3. A device as defined in claim 2, in which said vital profile speed limit generator further includes means for decrementing the profile limit as a function of distance travelled at a rate which equals or exceeds the minimum braking capacity of the train.

4. A device as defined in claim 1, further comprising a wheelsize switch arrangement for measuring wheelsize.

5. A device as defined in claim 4, further comprising means for wheelsize multiplier verification, thereby to prove that a wheelsize switch has been read correctly.

6. A device as defined in claim 1, in which means for generating safe speed verification includes means for combining five factors by polynomial division.

* * * * *